United States Patent
Roffman

[19]

[11] Patent Number: 5,929,969
[45] Date of Patent: Jul. 27, 1999

[54] MULTIFOCAL OPHTHALMIC LENS

[75] Inventor: Jeffrey H. Roffman, Jacksonville, Fla.

[73] Assignee: Johnson & Johnson Vision Products, Inc., Jacksonville, Fla.

[21] Appl. No.: 08/946,825

[22] Filed: Oct. 8, 1997

Related U.S. Application Data

[63] Continuation-in-part of application No. 08/847,801, Apr. 28, 1997, abandoned, which is a continuation of application No. 08/434,933, May 4, 1995, abandoned.

[51] Int. Cl.⁶ .................................................. G02C 7/04
[52] U.S. Cl. ............................................................ 351/161
[58] Field of Search ..................... 351/161, 168, 351/160 R, 160 H; 623/6

[56] References Cited

U.S. PATENT DOCUMENTS

| | | | |
|---|---|---|---|
| 4,704,016 | 11/1987 | de Carle | 351/161 |
| 4,890,913 | 1/1990 | de Carle | 351/161 |
| 4,923,296 | 5/1990 | Erickson | 351/151 |
| 5,002,382 | 3/1991 | Seidner | 351/161 |
| 5,020,898 | 6/1991 | Townsley | 351/160 |
| 5,024,517 | 6/1991 | Seidner | 351/161 |
| 5,050,981 | 9/1991 | Roffman | 351/177 |
| 5,054,905 | 10/1991 | Cohen | 351/161 |
| 5,151,723 | 9/1992 | Tajiri | 351/160 |
| 5,158,572 | 10/1992 | Nielson | 351/161 |
| 5,191,365 | 3/1993 | Stoyan | 351/160 |
| 5,192,317 | 3/1993 | Kalb | 623/6 |
| 5,198,844 | 3/1993 | Roffman et al. | 351/177 |
| 5,348,396 | 9/1994 | Roffman et al. | 351/161 |
| 5,349,395 | 9/1994 | Stoyan | 351/161 |
| 5,404,183 | 4/1995 | Seidner | 351/161 |
| 5,406,341 | 4/1995 | Blum et al. | 351/160 |
| 5,408,278 | 4/1995 | Christman | 351/44 |
| 5,408,281 | 4/1995 | Zhang | 351/161 |
| 5,422,687 | 6/1995 | Tanaka et al. | 351/161 |
| 5,430,504 | 7/1995 | Muckenhirm et al. | 351/161 |
| 5,436,678 | 7/1995 | Carroll | 351/161 |
| 5,440,359 | 8/1995 | Bloch-Malem | 351/203 |
| 5,448,312 | 9/1995 | Roffman et al. | 351/161 |
| 5,485,228 | 1/1996 | Roffman et al. | 351/161 |

FOREIGN PATENT DOCUMENTS

| | | | |
|---|---|---|---|
| 201 231 | 11/1986 | European Pat. Off. | G02C 7/04 |
| 225 098 | 6/1987 | European Pat. Off. | G02C 7/04 |
| 445 994 Ae | 9/1991 | European Pat. Off. | G02C 7/06 |
| 32 46 306 A1 | 6/1984 | Germany | G02C 7/04 |
| 2 139 375 | 11/1984 | United Kingdom | G02C 7/04 |
| 94/23327 | 10/1994 | WIPO | G02C 7/04 |

*Primary Examiner*—Georgia Epps
*Assistant Examiner*—Jordan M. Schwartz

[57] ABSTRACT

An ophthalmic lens provides a cumulative ratio of distance to near focal length that is predominantly distance correction under high illumination, nearly evenly divided between distance and near correction under moderate illumination, and favoring again distance vision correction under low level illumination. The lens is specifically adjusted to match the patient's pupil size as a function of illumination level, in the preferred embodiment by applying pupil size parameters as a function of age. This lens has the properties of matching both the distribution of near and distance focal vision correction to the type of human activity typically undertaken in various illumination conditions, as well as matching particular lens dimensions to suit the size of the pupil as a function of illumination intensity.

24 Claims, 13 Drawing Sheets

FIG. 3
_PRIOR ART_
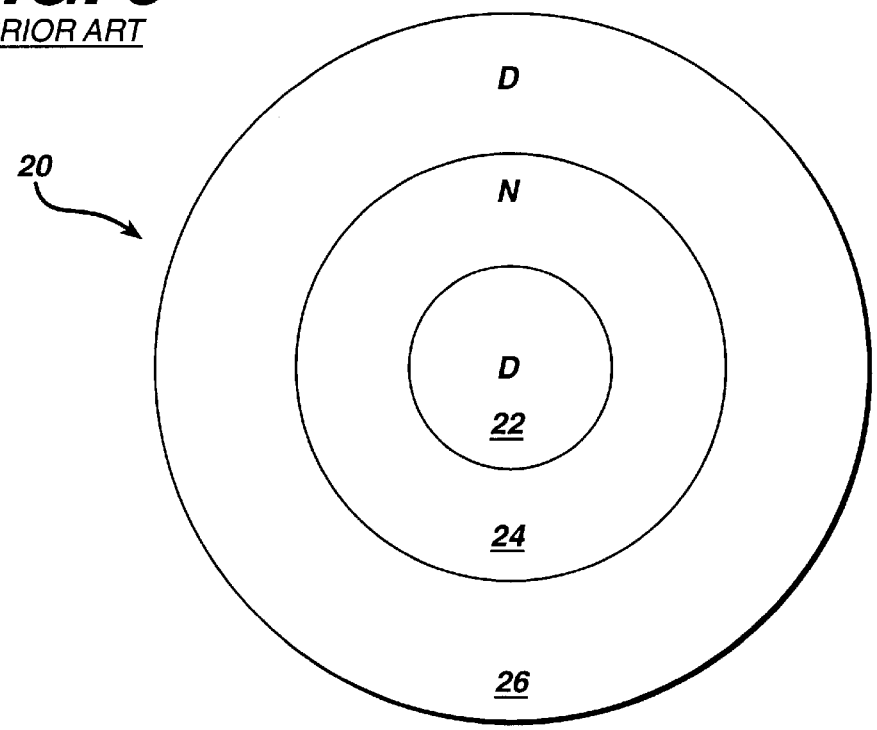
FIG. 4
_PRIOR ART_
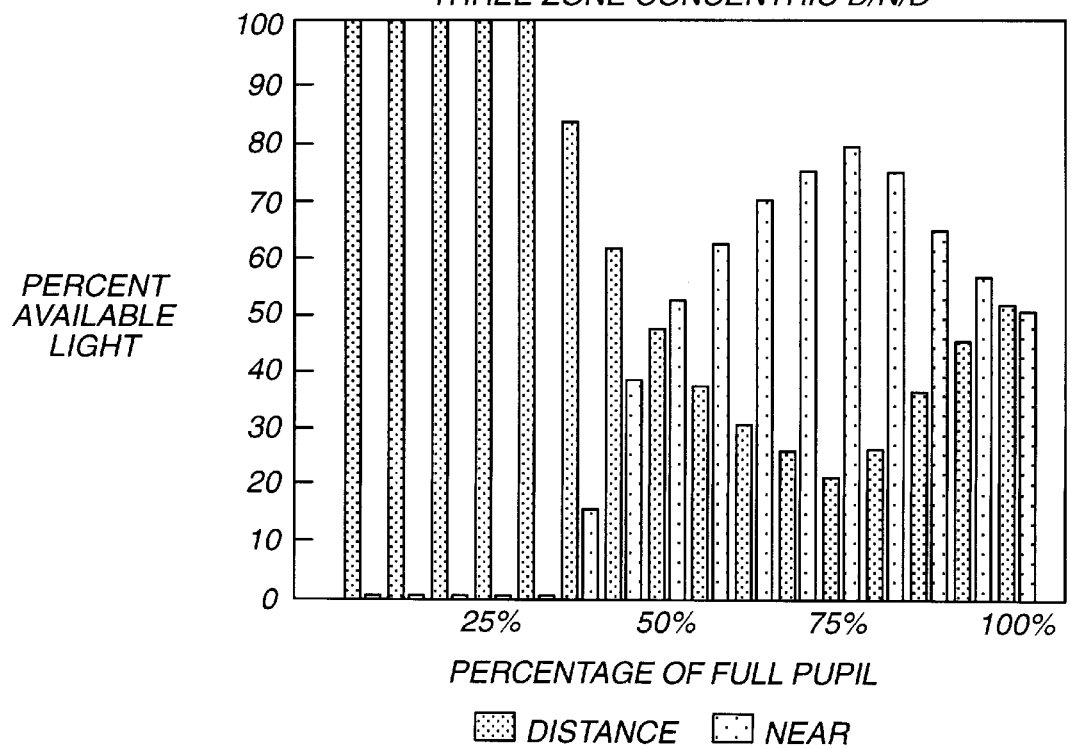

FIG. 5
_PRIOR ART_
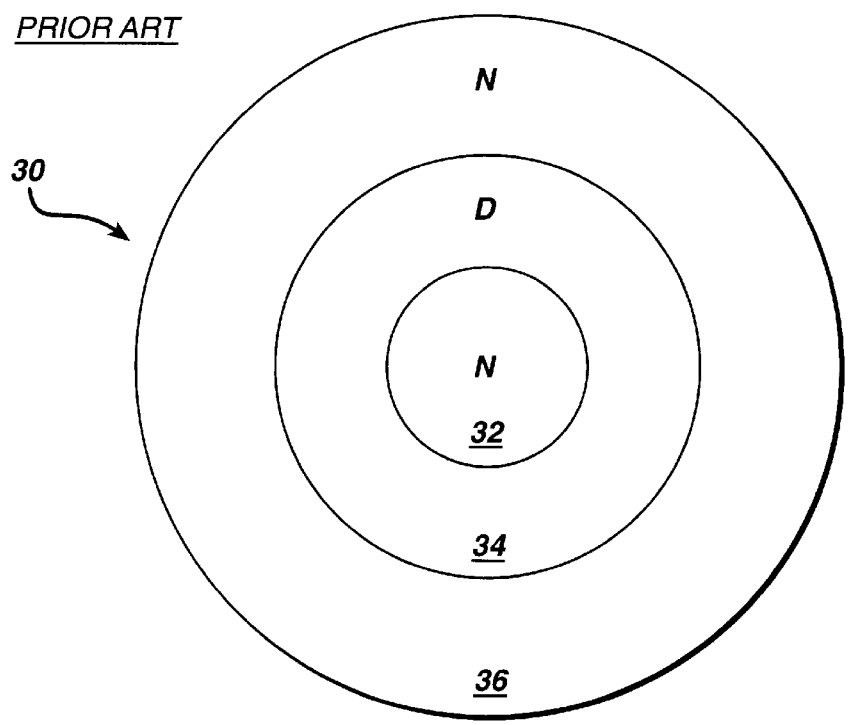
FIG. 6
_PRIOR ART_
NEAR & DISTANCE FOCAL LENGTH LIGHT FRACTION
TRI ZONE N/D/N
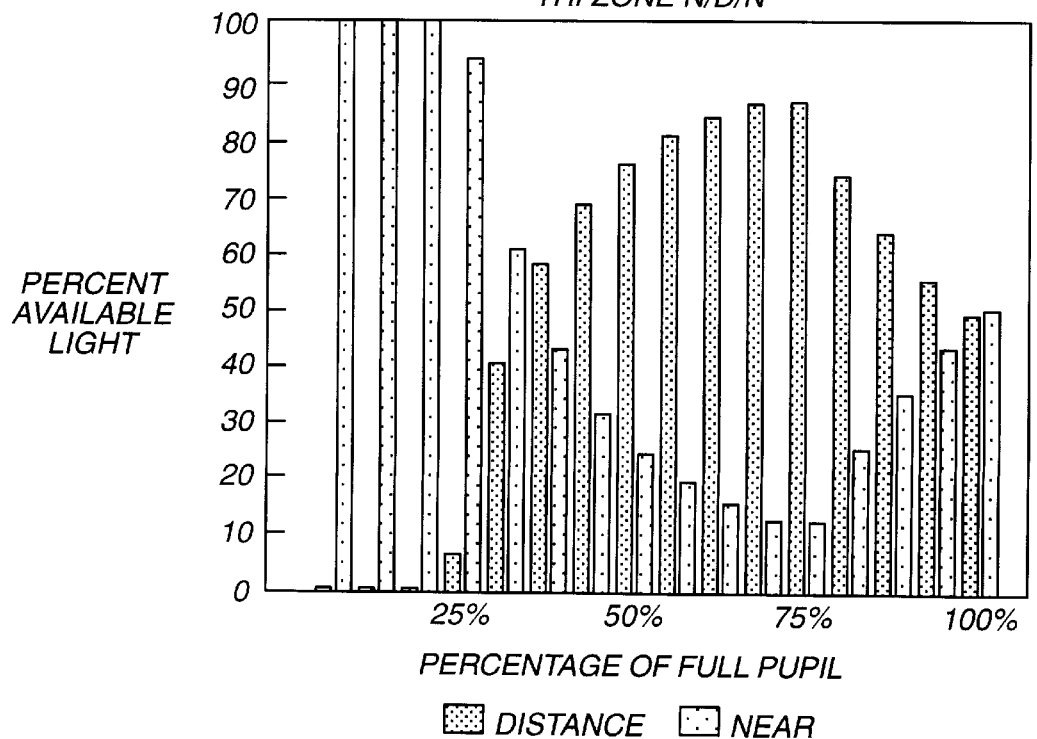

MULTIFOCAL OPHTHALMIC LENS

This is a continuation in part of U.S. Ser. No. 08/847,801 filed Apr. 28, 1997 now abandoned which is a continuation of U.S. Ser. No. 08/434,933 filed May 4, 1995 now abandoned, both having the same title and inventor, and both are incorporated herein by reference.

BACKGROUND OF THE INVENTION

This invention generally relates to ophthalmic lenses, and more particularly to ophthalmic lenses having multiple optical powers or focal lengths.

Multifocal ophthalmic lenses are often worn to help individual focus on near objects. To elaborate, each eye contains a natural lens that is used to focus images on the retina of the eye. In a person with normal eyesight, this lens of the eye is naturally shaped to focus the images of distant objects on the retina, and the eye lens is bent in order to focus the images of near objects on the retina. This adjustment of the eye lens to focus the images of objects at various distances on the retina is referred to as accommodation.

With many people, the accommodation of the eyes is inadequate, a condition referred to as presbyopia. For example, the accommodation of the human eye naturally diminishes with age, so that many people develop presbyopia as they age. Also, because of cataracts, many people have their natural lenses removed and replaced with artificial intraocular lenses, which have no ability to change or adjust inside the eye. Inadequate accommodation may be corrected by spectacles or other lenses having a number of different regions with different optical powers. With such spectacles, the wearer can shift his or her line of vision so that an object is observed through the portion of the spectacle having the appropriate optical power needed to focus properly the image of the object.

Heretofore, efforts to provide contact lenses that have multiple focal lengths, either to correct for presbyopia or for other reasons, have not been completely satisfactory.

One prior art approach to providing multifocal contact lenses is to provide a user with a different contact lens for each eye. One contact lens is provided with near power — that is, the lens is designed to focus on near objects — and the other contact lens is provided with distance power — that is, the lens is designed to focus on distant objects. This approach, referred to as monovision, utilizes the fact that, under certain circumstances, the brain can discriminate between separate, competing images received by the two eyes, and can accept an in-focus image while rejecting a competing out-of-focus image. Monovision can correct or alleviate presbyopia without requiring complex lens designs or manufacture. However, monovision has important disadvantages in that it results in losses in binocular image summation and in substantial loss of depth perception, referred to as binocularity.

Another example of multifocal contact lenses that utilizes the ability of the brain to discriminate between competing images is disclosed in U.S. Pat. No. 4,923,296. This patent describes a contact lens system which comprises a pair of contact lenses, each having equal areas of near and distance optical power. The lens for one eye has an upper half with near optical power and a lower half with distance optical power, while the lens for the other eye has an upper half with distance optical power and a lower half with near optical power. When the lenses are used together, as described in this patent, the lenses provide at least partial clear images in both eyes and, through suppression by the brain of the blurred images, allow alignment of the clear image to produce a focused image.

An additional prior art approach to providing multi-focal contact lenses employs the principal that the size of the pupil of the eye changes depending on the intensity of the light incident on the eye; and specifically, the pupil contracts in response to brighter light. Thus, when a person is wearing contact lenses, then, in response to brighter light, the light that is focused on the retinas of the eyes comes through smaller areas of the contact lenses.

For example, U.S. Pat. No. 4,890,913 describes a bifocal contact lens comprised of a number of annular zones having different optical powers. The objective of this lens design is to maintain an approximately equal division between near and distance optical powers at all times and regardless of pupil diameter, and this requires between six and twelve zones of differing optical powers on the lens.

A further attempt at providing a bifocal contact lens is described in U.S. Pat. No. 4,704,016. The lens disclosed in this patent also attempts to maintain, at all times and regardless of pupil diameter, an approximately equal division between near and distance powers.

Another approach to producing a multifocal corrective eye lens involves the use of diffractive optics. One disadvantage of this approach, though, is a deficiency in vision at low light levels. To elaborate, in a diffractive design, only about 40% of the light incident on the lens is used for near vision with another 40% being used for far vision. The remaining 20% of the incident light is not used for either near or far vision, but rather is lost to higher orders of diffraction and to scatter effects. These 40% values represent the best theoretical case and, in practice, even less light is available due to difficulties encountered in manufacturing these lenses. Difficulty of manufacture in general represents another disadvantage of diffractive lenses since the diffractive surfaces of these lenses must be produced within tolerances that are on the same order of magnitude as the wavelength of light. For the reasons discussed above, although simple multifocal refractive lens systems, such as monovision, are somewhat understood, more complex schemes for such lens systems are primarily theoretical.

U.S. Pat. Nos. 5,002,382 and 5,024,517 disclose complementary pairs of contact lenses having two or more corrective optical powers in opposite configurations. Both of the lenses in each pair, however, contain only two zones of different optical power.

A more practical and improved approach to providing a multi-focal ophthalmic lens is described in copending application Ser. No. 07/827,199 filed on Jan. 28, 1992. This application discloses a multifocal ophthalmic lens having a central zone that is part of one of the multifocal segments of the lens. The boundary between the segments of this lens is defined by an arcuate path such as a semi-circle and both ends of this path are on the adjoining perimeter of the near and distance segments. This design eliminates from the central optical axis the segment boundaries including the central junction point.

Lenses made according to the above-described application are functional under certain illumination conditions with some patients. Nevertheless, it is believed that the general level of satisfaction with multifocal ophthalmic lenses may be improved. With current multifocal lens designs, patients may have problems with competing images under high levels of illumination, and may have problems reading under medium-to-low illumination conditions In addition, at night, patients may have problems caused by haloes appearing around light sources, a problem that may be particularly troublesome in night driving situations.

SUMMARY OF THE INVENTION

An object of this invention is to improve ophthalmic lenses for correcting presbyopia.

Another object of the present invention is to provide an ophthalmic lens for correcting presbyopia that yields improved visual acuity in general and, in particular, meets the focal requirements of the wearer under various light intensity conditions.

Another object of this invention is to correlate the distribution of near and distance focal vision correction provided by an ophthalmic lens to the type of human activities typically undertaken in various illumination conditions.

A further object of the present invention is to design a multi-focal length ophthalmic lens on the basis of both the manner in which a wearer's pupils vary as a function of illumination intensity, and the types of human activities typically undertaken in various illumination conditions.

A further object of the invention is to fit a multi-focal ophthalmic lens to a wearer by matching the optical power required by the wearer to the size of the wearer's pupil under various illuminating conditions.

These and other objectives are achieved with a multi-focal contact lens comprising a body having a hollow concave shape and including a central region and at least first and second concentric annular regions. The central region has an optical surface area and a first optical power. The first annular region extends around the central region and includes a plurality of concentric, annular sub-regions, and these sub-regions are positioned in series and include an innermost sub-region and at least one additional sub-region.

The innermost sub-region has a second optical power and has an optical surface area about equal to or larger than the optical surface area of the central region. Preferably, the sum of the optical surface areas of the central and first annular regions that have the first optical power is approximately equal to the sum of the optical surface areas of the first annular region that have the second optical power. In addition, about half or more of the optical surface area of the lens has the first optical power; and preferably, about 60% or more of that optical surface area has the first optical power. In an embodiment described in detail herein, about 70% of the optical surface area of the lens has the first optical power, and about 30% of that surface area has the second optical power.

When the lens is worn and the effective portion of the lens — that is, the portion of the lens which passes light that then passes through the pupil — varies, the sizes of the areas of the lens in that effective portion and having near and distant focal powers, also vary. With a preferred lens design, the ratio of the former area to the latter area changes — as the effective portion of the lens changes — so that the corrective power provided by the lens (i) is predominantly a first optical power (usually distance) correction under high illumination conditions, (ii) is nearly evenly divided between near and distance optical powers under moderate illumination levels, and (iii) again favors the first optical power vision correction under low level illumination.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 3 illustrates a prior art ophthalmic lens having three zones of optical powers.

FIG. 4 shows a comparison between the distance and near focal length image areas of the lens of FIG. 3 at various pupil diameters.

FIG. 5 shows another prior art ophthalmic lens having three zones of optical powers.

FIG. 6 is a bar graph illustrating the distribution of the near and distant focal length image areas of the lens of FIG. 5 at various pupil diameters.

DETAILED DESCRIPTION OF THE PREFERRED EMBODIMENT

Figure 1:
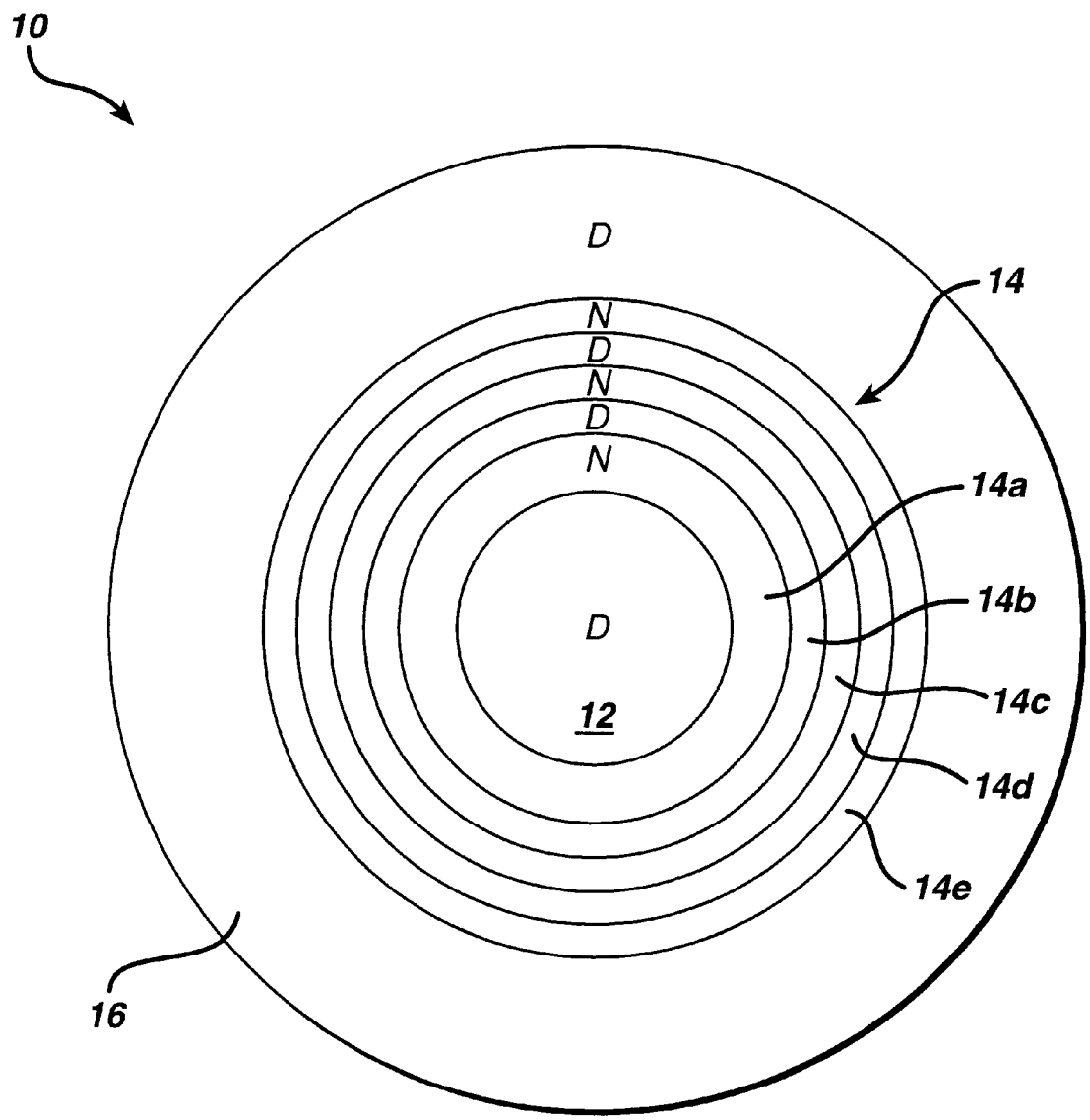
FIG. 1 shows a portion of an ophthalmic lens embodying the present invention.

FIG. 1 shows the optical surface of an ophthalmic lens 10 comprising central region 12, first annular region 14, and second annular region 16; and preferably, annular region 14 includes a series of annular bands or subregions 14a–14e. Lens 10 also includes a peripheral or lenticular area (not shown) that does not contribute to the optical performance of the lens.

In accordance with the present invention, region 12 and the innermost band 14a of region 14 have opposite types of optical power. For example, if region 12 has a distance optical power, band 14a has a near optical power; while if region 12 has a near optical power, band 14a has a distance optical power. In addition, the innermost band 14a of region 14 is located immediately outside of and extends immediately around region 12, and the area of band 14a is substantially equal to the area of central region 12. Also, preferably, the optical powers of the bands 14a–14e of region 14 alternate between near and distance optical powers. Further, about half or more of the optical surface area of the lens has a first optical power; and preferably, about 60% or more of that optical surface area has that first optical power.

With the specific embodiment of lens 10 shown in FIG. 1, central region 12 has a distance optical power, the bands 14a–14e, respectively, have near, distance, near, distance, and near optical powers, and band 16 has a distance optical power. In addition, with this embodiment of lens 10, about 70% of the optical surface area of the lens has a distance optical power, and about 30% of that surface area has a near optical power.

With the lens of the present invention, the regions and subregions of the lens that contribute to the effective corrective power ratio of the lens at any given time are determined by the size of the wearer's pupil at that time. The manner in which the size of a person's pupil varies is predictable, principally depending on the illumination level and the age of the person. In particular, for people of the same age, the size of their pupils change, as a function of illumination level, in the same or substantially the same way. Thus, the way in which a person's pupils change size, as a function of the illumination level, can be estimated based on the age of the person.

Moreover, it has been found that there is a correlation between the size of a person's pupil — as a percentage of the pupil's maximum size — and the type of corrective power, either far or near, that he or she needs. Specifically, when the size of a person's pupil is at either the low or high end of its size range, typically that person needs distance correction; while when a person's pupil is in the middle of its size range, that person usually needs either near or far correction.

Thus, when the lens of the present invention is worn, the diameter of the portion of the lens that contributes to the effective power of the lens varies in response to changes in the corrective needs of the wearer; and preferably, the regions and subregions of the lens are designed so that as the corrective needs of the wearer change, the effective corrective power of the lens also changes to consistently match those changing needs.

The design parameters for the lens 10 of FIG. 1, which is specifically designed to accommodate a person of an age between 40 years and 60 years, is given in the Table I below. The leftmost column in this Table lists various pupil sizes as a percentage of the maximum pupil size. The two columns on the right of Table I identify, for each of the listed pupil diameters, the percentages of the effective corrective area of the lens — that is, the area of the lens that contributes to the corrective power of the lens at that pupil diameter — that are, respectively, distance and near corrective powers.

TABLE I

Pupil-Tuned Lens

| {PRIVATE} Pupil Size (as % maximum size) | Percentage of the effective corrective area of the lens that is distance corrective power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 70.6 | 29.4 |
| 37.5 | 49.0 | 51.0 |
| 43.8 | 49.8 | 50.2 |
| 50.0 | 49.4 | 50.6 |
| 56.3 | 49.9 | 50.1 |
| 62.5 | 49.6 | 50.4 |
| 68.8 | 48.2 | 51.8 |

TABLE I-continued

Pupil-Tuned Lens

| {PRIVATE} Pupil Size (as % maximum size) | Percentage of the effective corrective area of the lens that is distance corrective power | Percentage of the effective corrective area of the lens that is near corrective power |
| --- | --- | --- |
| 75.0 | 56.4 | 43.6 |
| 81.3 | 62.9 | 51.8 |
| 87.5 | 68.0 | 37.0 |
| 93.8 | 72.1 | 27.9 |
| 100.0 | 75.5 | 24.5 |

Figure 2:
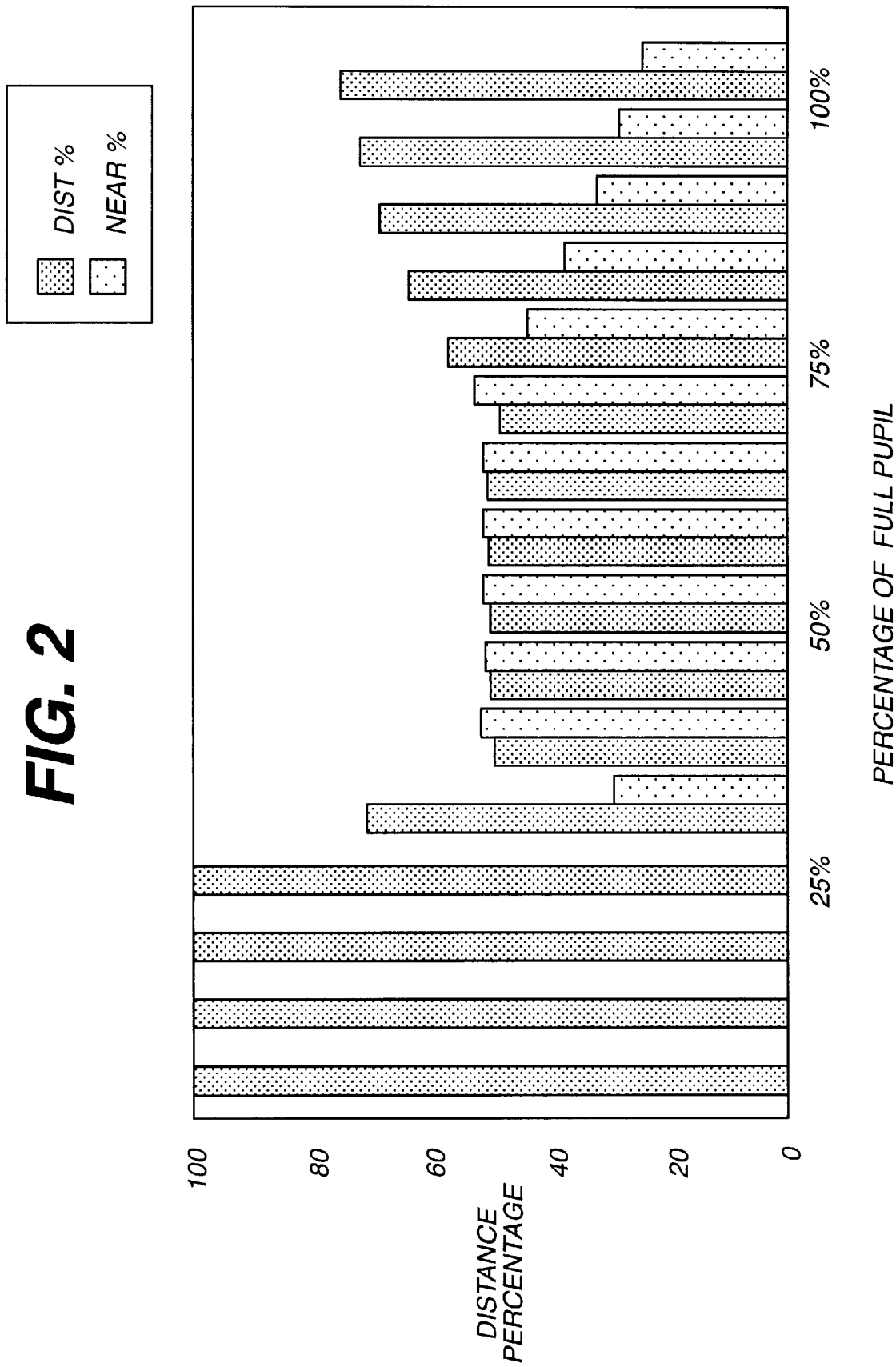
FIG. 2 is a bar graph showing a comparison between the distance and near focal length image areas of the lens of FIG. 1 at various pupil diameters.

FIG. 2 shows, in bar graph form, a comparison between the distance and near focal length image areas, at various pupil diameters, provided by a lens constructed according to FIG. 1. It is clear from FIG. 2 that the lens achieves the above-discussed objective of having predominantly distance vision correction at small and large pupil diameters (which correspond to high and low level illumination intensities) and nearly equal areas of distance and near vision correction at intermediate pupil diameters (which correspond to moderate illumination levels).

The results and advantages of the lens 10 become more clear when compared to a similar analysis of prior art lenses.

For example, FIG. 3 shows a typical prior art, three zone ophthalmic lens 20 having a central region 22 providing a distance correction, followed by a first annular region 24 providing a near correction followed by a second annular region 26 providing a distance correction. The particular design parameters for this prior art design are given in the following Table II.

TABLE II

Distance/Near/Distance Prior Art Lens

| {PRIVATE}Pupil Size (as a % of maximum size) | Percentage of the effective corrective area of the lens that is distance corrective power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 100 | 0 |
| 37.5 | 69.4 | 30.6 |
| 43.8 | 51.0 | 49.0 |
| 50.0 | 39.1 | 60.9 |
| 56.3 | 30.9 | 69.1 |
| 62.5 | 25.0 | 75.0 |
| 68.8 | 20.7 | 79.3 |
| 75.0 | 19.0 | 51.0 |
| 81.3 | 31.0 | 69.0 |
| 87.5 | 40.5 | 59.5 |
| 93.8 | 48.2 | 51.8 |
| 100 | 54.4 | 45.6 |

FIG. 4 is a graph, analogous to that of FIG. 2, showing the percent distribution of the distance and near focal length areas, for different pupil diameters, provided by the lens of FIG. 3. As is readily apparent, the distribution of distance and near optical powers provided by the prior art lens 20 is substantially different from the corresponding distribution provided by the design of the present invention. In particular, the prior art distance/near/distance design provides the wearer with no usable near correction unless the pupil diameter is near its maximum, which occurs when the light illumination level is between extremely low level and the far end of the mid-range level.

FIG. 5 shows another prior art lens 30. Lens 30, similar to the lens 20 of FIG. 3, has three optical zones, but lens 30 has a different polarity than lens 20 — that is, with lens 30, the central region 32 provides a near correction, the first annular region 34 provides a distance correction, and the second annular region 36 provides a near correction.

The specific design parameters of lens 30 are given in the following Table III.

TABLE III

Near/Distance/Near Prior Art Lens

| {PRIVATE}Pupil Size (as a % of size) | Percentage of the effective corrective area of the lens that is distance correction power | Percentage of the effective corrective area of the lens that is near corrective power |
|---|---|---|
| 0.00 | 0 | 0 |
| 6.3 | 0 | 100 |
| 12.5 | 0 | 100 |
| 18.8 | 0 | 100 |
| 25.0 | 0 | 100 |
| 31.3 | 0 | 100 |
| 37.5 | 30.6 | 69.4 |
| 43.8 | 49.0 | 51.0 |
| 50.0 | 60.9 | 39.1 |
| 56.3 | 69.1 | 30.9 |
| 62.5 | 75.0 | 25.0 |
| 68.8 | 79.3 | 20.7 |
| 75.0 | 81.0 | 19.0 |
| 81.3 | 69.0 | 31.0 |
| 87.5 | 59.5 | 40.5 |
| 93.8 | 51.8 | 48.2 |
| 100 | 45.6 | 54.4 |

FIG. 6 shows the percent distribution of distance and near focal length image areas, for different pupil diameters, provided by the lens 30 of FIG. 5. A comparison of FIGS. 2 and 6 shows that there also are substantial differences between the distributions of distance and near optical powers provided by lenses 10 and 30. In particular, under high illumination levels, lens 30 does not provide a significant distance correction component, which is needed for outdoor vision in bright sunlight. The distance vision correction provided by lens 30 suffers even in mid range illumination levels. Further, with lens 30, under extremely low level light conditions, distance vision correction is provided for no more than 50% of the available light.

Similar analyses of other prior art lenses having two zones, one providing distance correction and the other providing near correction, show that the distributions of distance and near optical powers provided by these lenses also are inappropriate for the pupil size and the types of activities that take place under different illumination levels.

In order to help optimize the benefits that can be obtained from the present invention, reliable data relating to the manner in which pupil size varies with light intensity were obtained from people in four different age groups: (i) those less than 20 years of age, (ii) those between 20 and 40 years of age, (iii) those between 40 and 60 years of age, and (iv) those over 60 years of age. These pupil measurements were made on test subjects at three different luminance levels: 250, 50, and 2.5 candela per square meter ($cd/m^2$).

250 $cd/m^2$ is an extremely bright illumination level, and for example, is typically encountered outdoors in bright sunlight. 50 $cd/m^2$ is an intermediate level, often the result of a mix of light sources, and may be found both indoors and outdoors. The 2.5 $cd/m^2$ level is most typically found outdoors at night, usually in an uneven illumination situation such as night driving.

The results of these studies are given in the following Table IV. This Table gives the average pupil diameter at three different illumination levels, and the standard deviation in the pupil diameter.

TABLE IV

HORIZONTAL PUPIL SIZE

| {PRIVATE}Illumination (Candela/$m^2$) | Average Pupil Diameter (mm) | Standard Deviation (1Σ) |
|---|---|---|
| LESS THAN 20 YEARS OF AGE | | |
| 2.5 | 6.5962 | 0.9450 |
| 50 | 4.3499 | 0.5504 |
| 250 | 3.4414 | 0.3159 |
| 20 TO 40 YEARS OF AGE | | |
| 2.5 | 6.4486 | 0.8259 |
| 50 | 4.4843 | 0.6342 |
| 250 | 3.5040 | 0.4217 |
| 40 TO 60 YEARS OF AGE | | |
| 2.5 | 5.4481 | 0.9787 |
| 50 | 3.6512 | 0.5692 |
| 250 | 3.0368 | 0.4304 |
| GREATER THAN 60 YEARS OF AGE | | |
| 2.5 | 4.7724 | 0.6675 |
| 50 | 3.4501 | 0.5106 |
| 250 | 2.8260 | 0.3435 |

Also, at different illumination levels, humans are normally engaged in different types of activities that require different vision tasks. For example, at very high illumination levels, such as that represented by 250 $cd/m^2$, human activity is typically outdoors in bright sunlight and involves distant visual tasks. At a 50 $cd/m^2$ illumination level, human activity occurs both indoors and outdoors, and typically involves both near and far visual tasks. At low illumination levels, represented by the 2.5 $cd/m^2$ level, the activity that takes place is typically outdoors, at night and usually involves distant visual tasks, such as driving an automobile.

The preferred embodiment of the present invention is derived from the above-discussed discoveries, taken in combination with the teachings of my copending application Ser. Nos. 07/988,088 and 08/246,644 filed Dec. 9, 1992 and May 20, 1994, respectively, and titled "Tuned Pupil Multifocal Contact Lens Design" and "Multifocal Ophthalmic Lens Pair," respectively, the disclosures of which are hereby incorporated by reference.

As previously mentioned, the manner in which an individual's pupil size responds to variations in, or is a function of, illumination level, itself changes with age. In addition, a person's ability to accommodate — that is, to adjust the natural eye lens to focus on objects at various distances — also changes with age, and in particular, an individual may lose that ability with advanced age.

An inability to focus images that are relatively near (approximately 18 inches) is measured by the amount of positive optical power, as measured in diopters, that must be provided to the individual's base distance correction, if any, in order to enable the individual to focus the image properly. The positive optical power that is provided for this reason is typically referred to as add. An early presbyope may require one diopter or less of add, whereas an older patient may require two or up to three diopters of positive optical power to be added to his or her distance correction in order to be able to focus on near images.

In addition to the lens 10 shown in FIG. 1, a plurality of additional lenses were constructed in accordance with the present invention, and these lenses were designed to provide various types of distributions between distance and near optical powers.

Figure 7:
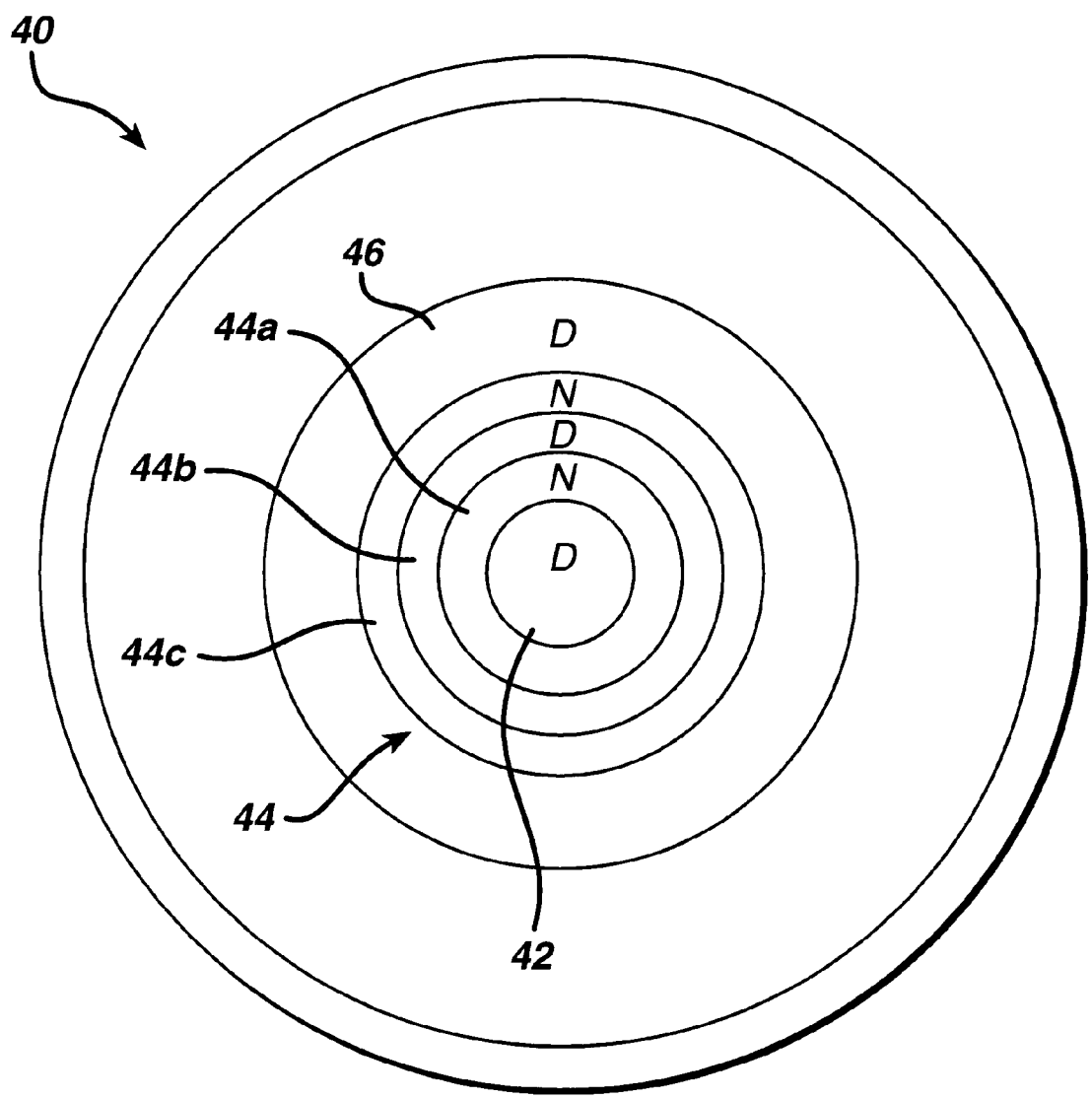
FIG. 7 illustrates a second lens embodying this invention.

FIG. 7 shows a lens 40 embodying this invention, and which provides a relatively low positive optical power. Lens 40 comprises a central region 42, first annular region 44 and second annular region 46; and annular region 44 includes a series of annular bands 44a, 44b and 44c. Annular region 44 is located outside of and extends around region 42, and annular region 46 is located outside of and extends around region 44. Region 42 has a distance optical power, and the innermost band 44a of region 44 extends immediately around region 42 and has a near optical power. Also, the area of band 44a is substantially equal to the area of region 42. The other bands 44b and 44c of region 44 alternately have distance and near optical powers, and the regions 42 and 44 and bands 44a, 44b and 44c of lens 40 are dimensioned so that the lens provides approximately equal areas of distance optical power and near optical power once the pupil of the wearer is approximately 40% dilated. Table V below lists the diameter of the regions and subregions for lens 40.

TABLE V

| Region or Subregion | Diameter (mm) |
| --- | --- |
| 42 | 2.00 |
| 44a | 3.30 |
| 44b | 4.25 |
| 44c | 5.20 |
| 46 | 8.00 |

Figure 8:
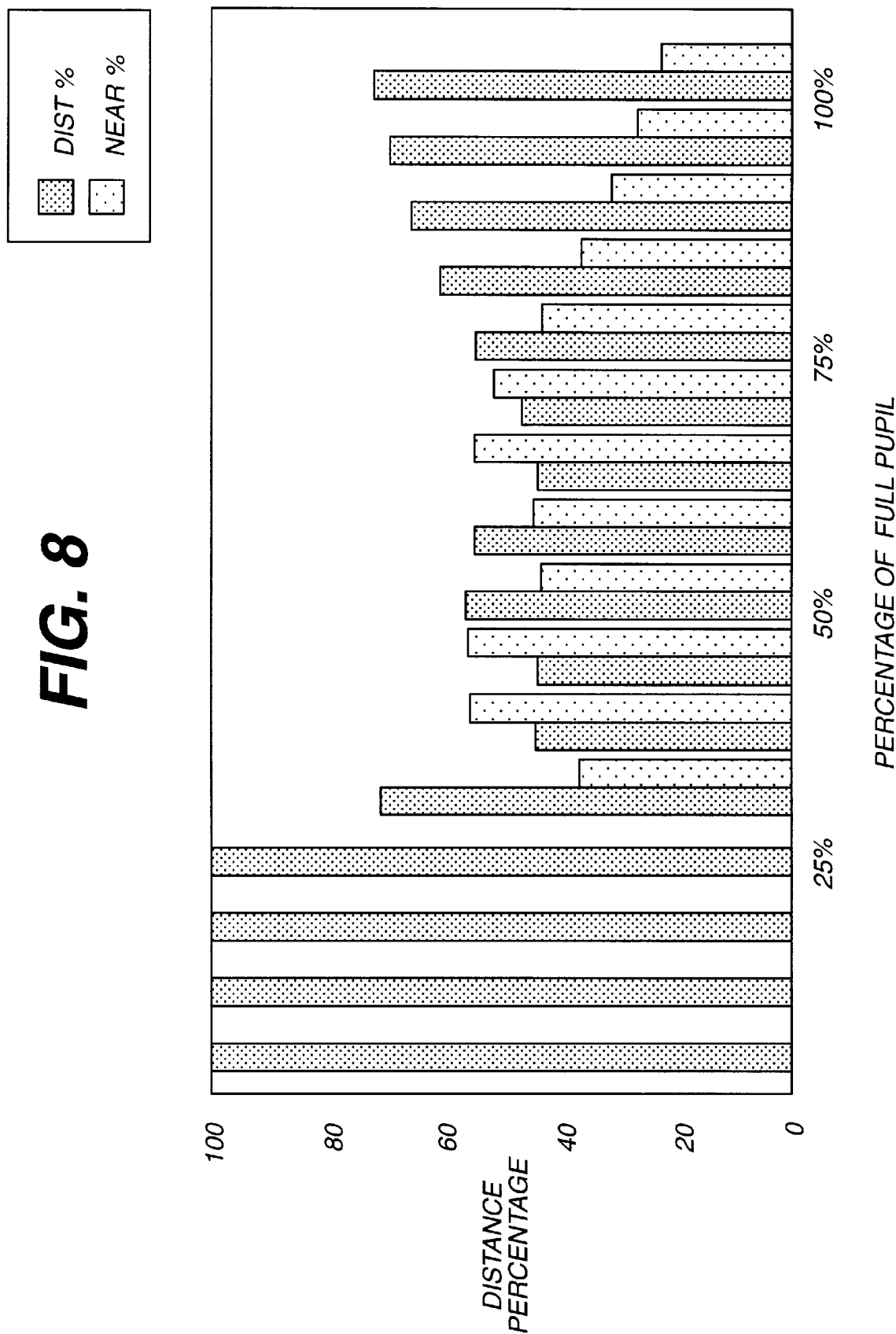
FIG. 8 is a bar graph, similar to FIG. 2, showing a comparison between the distance and near focal length image areas of the lens of FIG. 7 at various pupil diameters.

The particular design parameters for lens 40 are given in the following Table VI and illustrated in the graph shown in FIG. 8.

TABLE VI

DISTANCE/NEAR/DISTANCE LENS

| Pupil Size (as a % of maximum size) | Percentage of the effective corrective area of the lens that is distance correction power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 64.0 | 36.0 |
| 37.5 | 44.4 | 55.6 |
| 43.8 | 43.8 | 56.2 |
| 50.0 | 56.9 | 43.1 |
| 56.3 | 55.2 | 44.8 |
| 62.5 | 44.7 | 55.3 |
| 68.8 | 47.5 | 52.5 |
| 75.0 | 55.9 | 44.1 |
| 81.3 | 62.4 | 37.6 |
| 87.5 | 67.6 | 32.4 |
| 93.8 | 71.8 | 28.2 |
| 100.9 | 75.2 | 24.8 |

Figure 9:
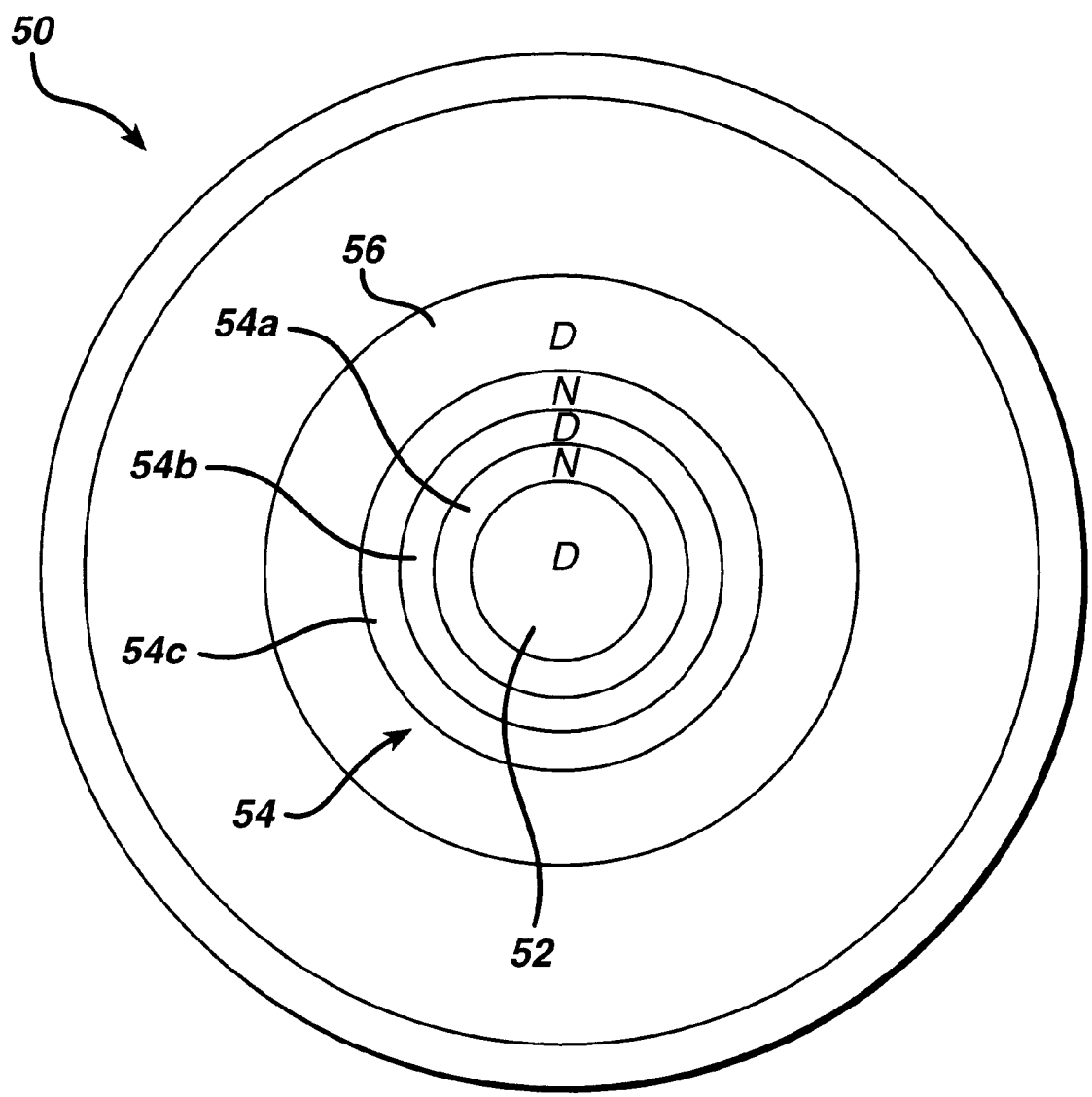
FIG. 9 shows a third embodiment of a lens according to the present invention.

FIG. 9 shows another lens 50 also embodying the present invention. Lens 50 comprises a first central region 52, a first annular region 54 located outside of and extending around region 52, and a second annular region 56 located outside of and extending around region 54. Region 54, in turn, includes a series of annular bands 54a, 54b and 54c. Region 52 has a distance optical power, and the innermost band 54a of region 54 extends immediately around region 52 and has a near optical power. Further, the area of band 54a is substantially equal to the area of region 52. The other bands 54b and 54c of region 54 alternately have distance and near optical powers. The regions 52, 54 and 56 and the bands 54a, 54b and 54c of lens 50 are dimensioned so that when the pupil of the wearer is constricted, the lens provides substantially 100% distance optical power. The optical power provided by the lens becomes more evenly distributed between distance power and near power as the pupil dilates, and at full pupil dilation the optical power provided by the lens is approximately 80% distance power and 20% near power. Table VII below lists the diameters of the regions and subregions of lens 50.

TABLE VII

| Region or Subregion | Diameter (mm) |
| --- | --- |
| 52 | 2.45 |
| 54a | 3.25 |
| 54b | 3.95 |
| 54c | 4.75 |
| 56 | 8.00 |

Figure 10:
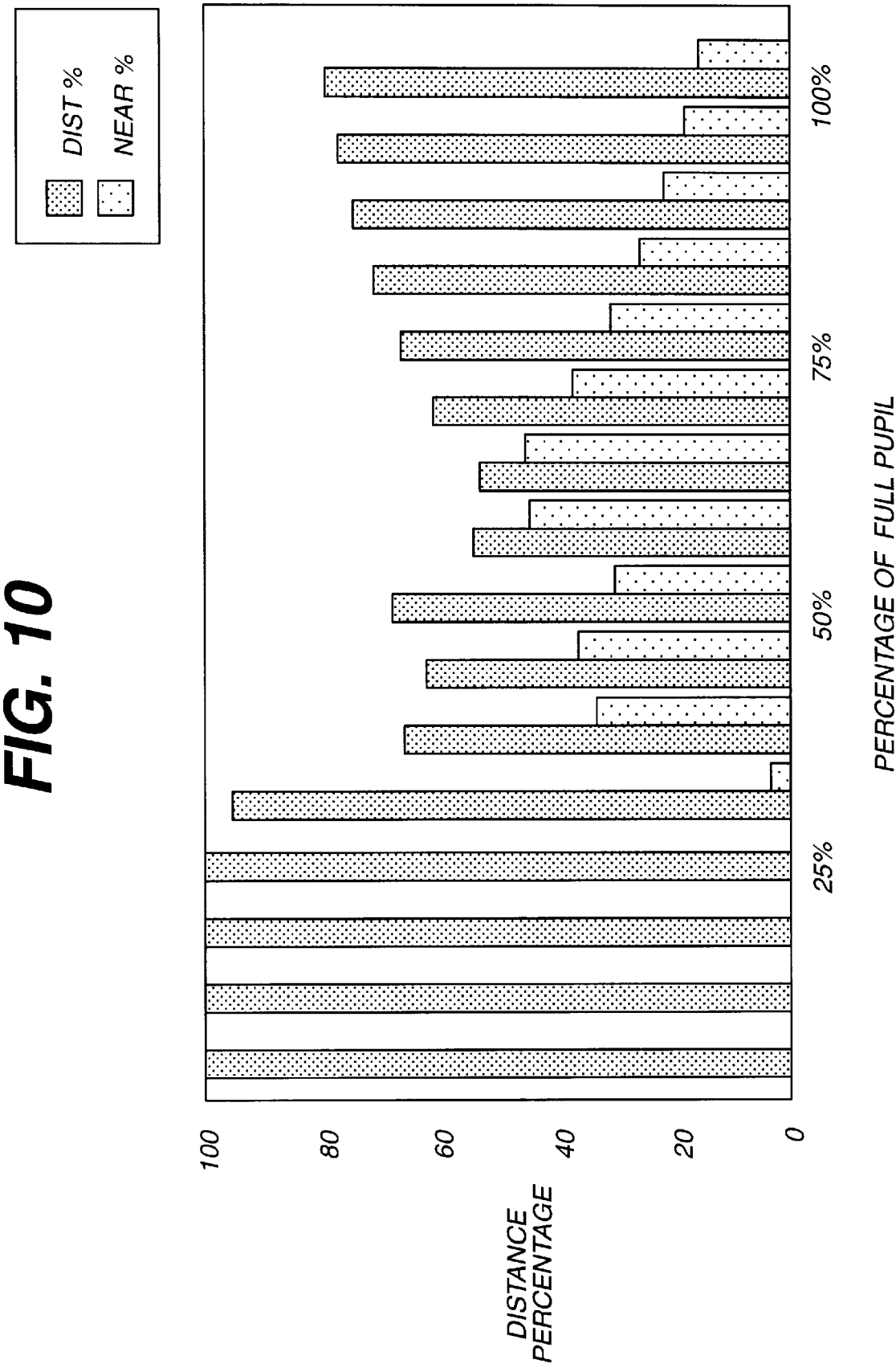
FIG. 10 is a bar graph illustrating a comparison between the distance and near focal length image areas of the lens of FIG. 9 at various pupil diameters.

The particular design parameters for lens 50 are given in the following Table VIII and illustrated in the graph shown in FIG. 10.

TABLE VIII

DISTANCE/NEAR/DISTANCE LENS

| Pupil Size (as a % of maximum size) | Percentage of the effective corrective area of the lens that is distance correction power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 96.0 | 4.0 |
| 37.5 | 66.7 | 33.3 |
| 43.8 | 62.8 | 37.2 |
| 50.0 | 69.0 | 31.0 |
| 56.3 | 54.5 | 45.5 |
| 62.5 | 53.9 | 46.1 |
| 68.8 | 61.9 | 38.1 |
| 75.0 | 68.0 | 32.0 |
| 81.3 | 72.7 | 27.3 |
| 87.5 | 76.5 | 23.5 |
| 93.8 | 79.5 | 20.5 |
| 100.9 | 82.0 | 18.0 |

Figure 11:
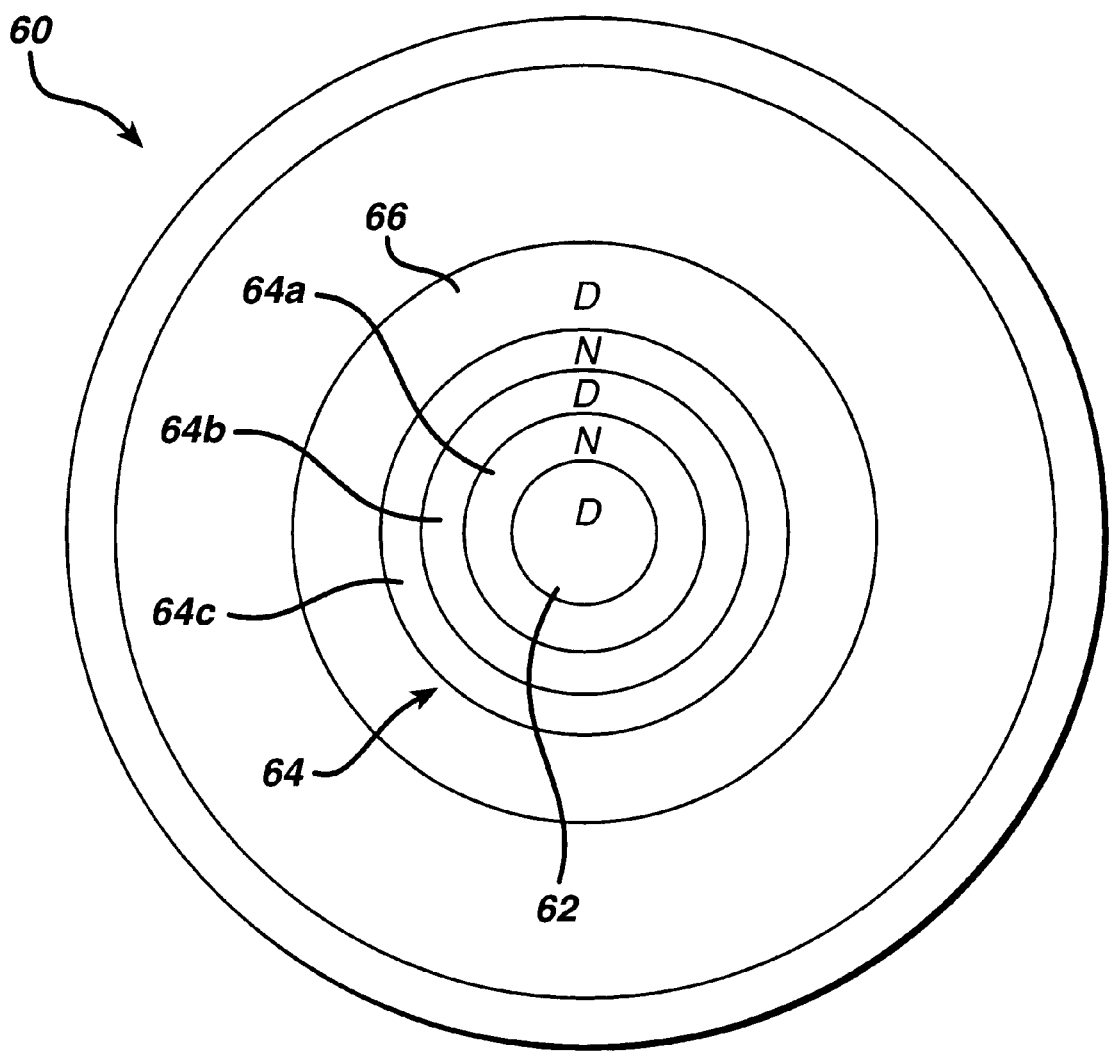
FIG. 11 illustrates a fourth lens embodying this invention.

FIG. 11 shows a lens 60 embodying this invention, and which provides a relatively low positive optical power. Lens 60 comprises a central region 62, first annular region 64 and second annular region 66; and annular region 64 includes a series of annular bands 64a, 64b and 64c. Annular region 64 is located outside of and extends around region 62, and annular region 66 is located outside of and extends around region 64. Region 62 has a distance optical power, and the innermost band 64a of region 64 extends immediately around region 62 and has a near optical power. Also, the area of band 64a is substantially equal to the area of region 62. The other bands 64b and 64c of region 64 alternately have distance and near optical powers, and the regions 62 and 64 and bands 64a, 64b and 64c of lens 60 are dimensioned so that the lens provides approximately equal areas of distance optical power and near optical power once the pupil of the wearer is approximately 40% dilated. Table IX below lists the diameters of the regions and subregions for lens 60.

TABLE IX

| Region or Subregion | Diameter (mm) |
|---|---|
| 62 | 2.00 |
| 64a | 3.30 |
| 64b | 4.45 |
| 64c | 5.25 |
| 66 | 8.00 |

Figure 12:
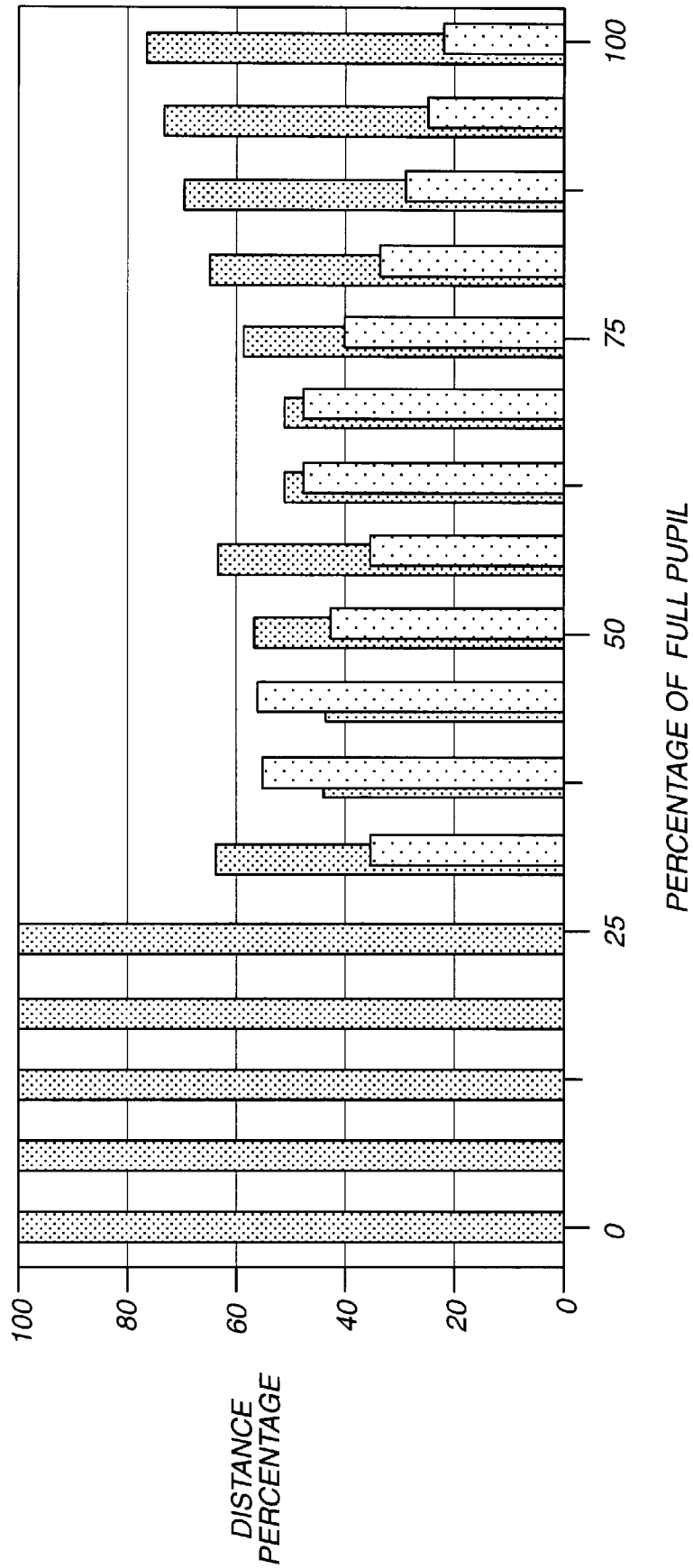
FIG. 12 is a bar graph, similar to FIG. 2, showing a comparison between the distance and near focal length image areas of the lens of FIG. 11 at various pupil diameters.

The particular design parameters for lens 60 are given in the following Table X and illustrated in the graph shown in FIG. 12.

TABLE X

DISTANCE/NEAR/DISTANCE LENS

| Pupil Size (as a % of maximum size) | Percentage of the effective corrective area of the lens that is distance correction power | Percentage of the effective corrective area of the lens that is near corrective power |
|---|---|---|
| 0.00 | 0 | 0 |
| 6.3 | 100 | 0 |
| 12.5 | 100 | 0 |
| 18.8 | 100 | 0 |
| 25.0 | 100 | 0 |
| 31.3 | 64.0 | 36.0 |
| 37.5 | 44.4 | 55.6 |
| 43.8 | 43.8 | 56.2 |
| 50.0 | 56.9 | 43.1 |
| 56.3 | 63.8 | 36.2 |
| 62.5 | 51.7 | 48.3 |
| 68.8 | 51.6 | 48.4 |
| 75.0 | 59.3 | 40.7 |
| 81.3 | 65.3 | 34.7 |
| 87.5 | 70.1 | 29.9 |
| 93.8 | 74.0 | 26.0 |
| 100 | 77.1 | 22.9 |

Figure 13:
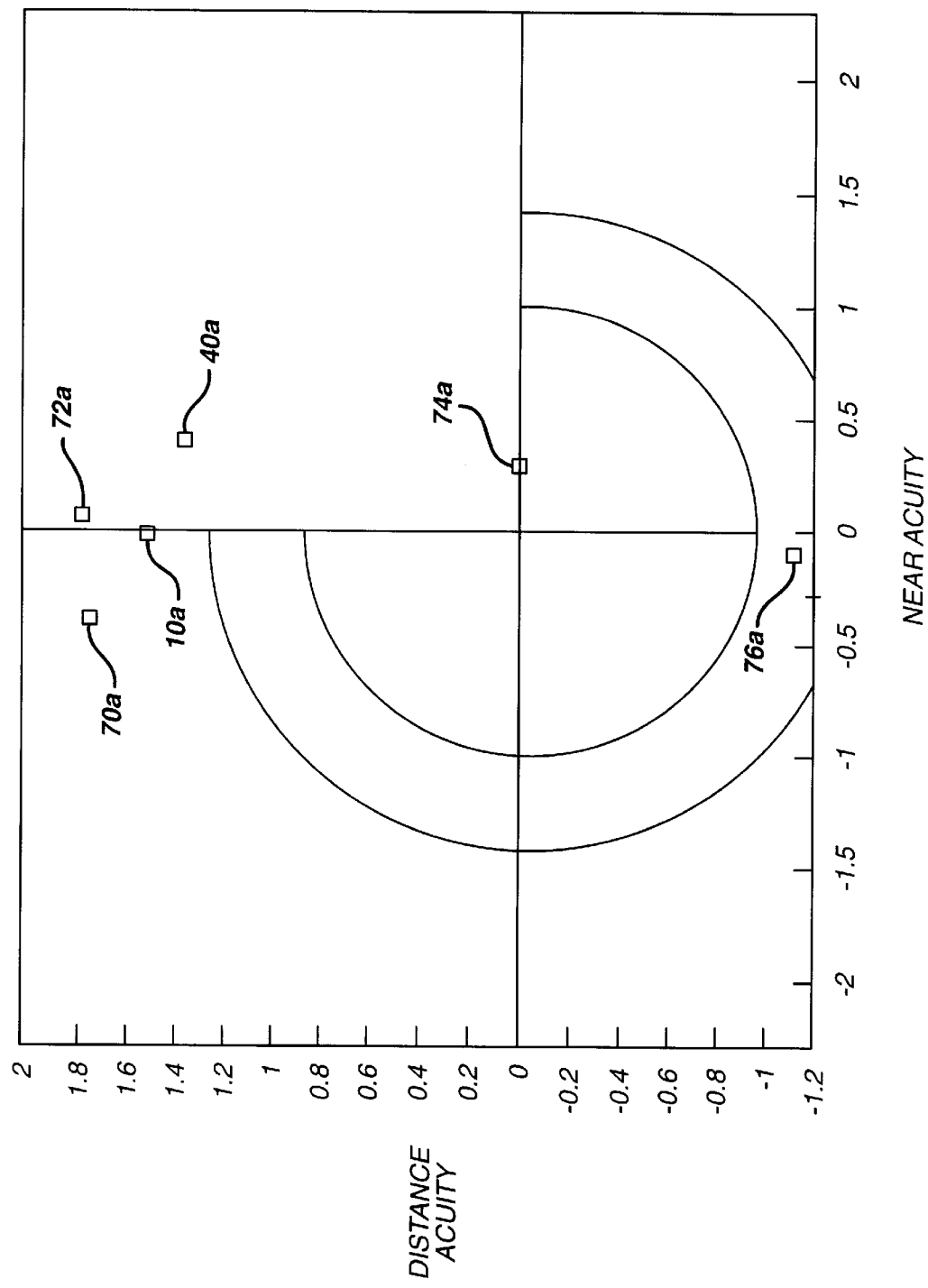
FIG. 13 is a graph showing, for a group of types of lenses, the average distance acuity of the wearers plotted versus the average near acuity of the wearers.

FIG. 13 is a graph illustrating average clinical results obtained for two of the above-discussed lenses, as well as average results obtained with various commercially available lenses. More specifically, FIG. 13 shows, for each of these lenses, the average distance acuity of the wearers plotted versus the average near acuity of the wearers, with the distance and near acuity measured in terms of the average number of lines lost by the wearers. The results obtained with lenses 10 and 40 are shown at 10a and 40a respectively. The points referenced at 70a, 72a, 74a and 76a show the results obtained, respectively, with commercially available bifocal spectacles, monovision lenses and bifocal contact lenses for presbyopes requiring a low diopter add. The best performing lenses are those that are plotted in the upper right-hand quadrant of FIG. 13, a quadrant referred to as the plus, plus quadrant.

Figure 14:
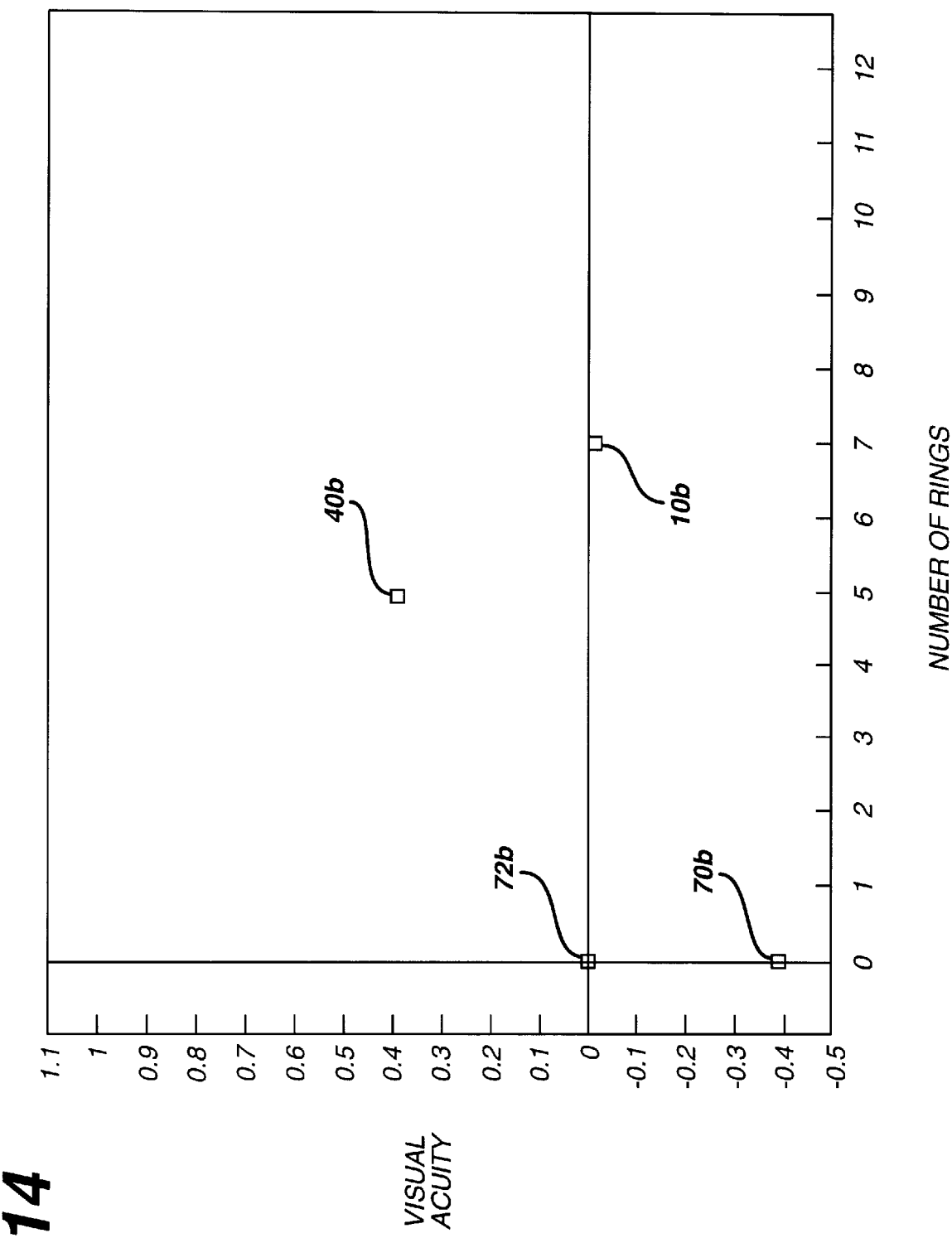
FIG. 14 is a graph formed by plotting, for each of a group of lenses or lens pairs, the average visual acuity of the lens wearers versus the number of rings in the lens or lens pair.

FIG. 14 is a graph formed by plotting different values relating to the above-discussed lenses. In particular, the graph of FIG. 14 is formed by plotting the average visual acuity of the lens wearer versus the number of rings in the lens, or lens pair, worn by the wearer. Lenses 10 and 40 are represented at 10b and 40b respectively. The points referenced at 70b and 72b represent, respectively, commercially available distance only spectacles and monovision lenses.

As an alternative to using concentric optical zones in the lenses of this invention, the annular portions of the lenses may be provided with the requisite ratio of distance and near focal lengths by employing the design scheme found in my copending application Ser. No. 07/827,199 filed on Jan. 28, 1992. This design method employs continuous radial segments containing different optical powers across annular portions.

With the lenses 10, 40, 50 and 60 discussed above, the optically active area of each lens is divided into discrete concentric zones with alternating distance and near powers. The present invention may also be embodied in lenses in which the optical power varies smoothly, rather than discretely, across the lens. The optical power of such a lens may, for example, vary as a smooth aspheric function across the lens. Aspheric in this sense can indicate, among other specific shapes, a conic asphere with varying eccentricity, or a polynomial function that simulates the functional discrete power split. The aspheric surface could be on the front or back surface of the lens.

Figure 15:
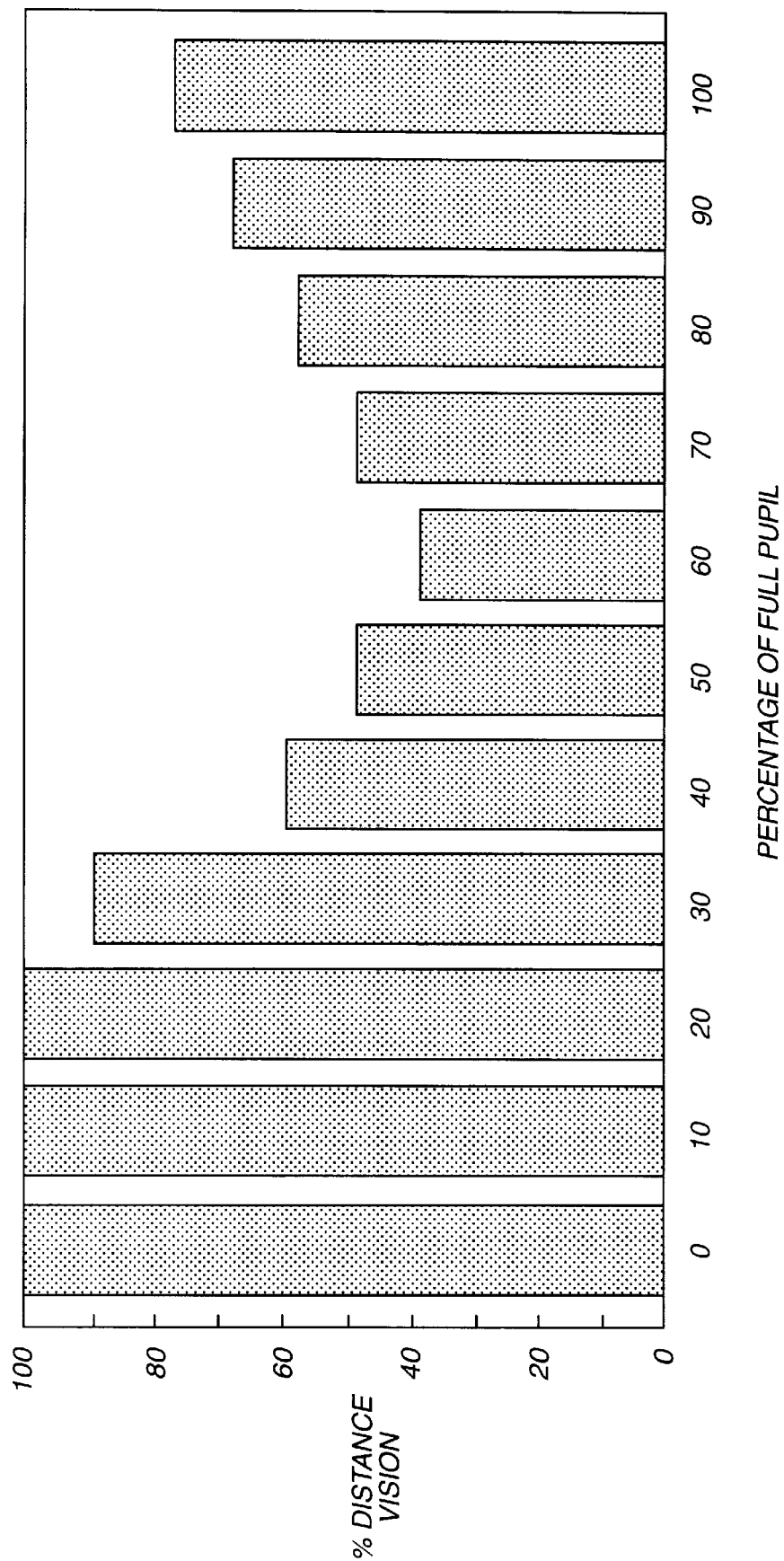
FIG. 15 illustrates, for a lens having an optical power that varies as an aspheric function across the lens, the manner in which the percentage of the optically effective area of the lens that has a distance power, itself changes as a function of pupil diameter.

FIG. 15 illustrates a typical power profile for a lens having an aspheric surface. In particular, FIG. 15 is a graph, similar to the graphs of FIGS. 2, 8 and 10; and FIG. 15 illustrates, for a lens having an optical power that varies as an aspheric function across the lens, and at various pupil diameters, the percentage of the optically effective area of such a lens that has a distance power.

The present invention may also be embodied in a family of lenses. Each lens in the family includes (i) a central area intended for distance vision, (ii) multiple annuli surrounding that central area and alternately designed for near vision and distance vision, and (iii) a peripheral zone intended for distance vision. In the preferred embodiment, in contact lens form, the areas or zones of the lens are provided with the desired near or distance powers by varying the design or shape of the back surface of the lens.

This design can also be used as/in IOL form. Across the family of lenses, the distance powers of the lenses are constant; however, the near powers of the lenses vary, so that as the subjects presbyopia increase, they may be provided with lenses having increased near power.

In this design family, a lens, or lens pair, can be fit to a subject in a standard fashion, so as to obtain a desired distance visual acuity, and obtaining improved near visual acuity from the annuli of the lens designed for near vision.

In addition, the present invention may also be embodied in a pair of lenses designed in accordance with a modified monovision methodology. In this design, one lens of the pair is particularly designed for a subject's dominant eye, and the other lens of the pair is particularly designed for the subject's non-dominant eye. More specifically, with this methodology, the lens for the subject's dominant eye is provided with one fill distance power — that is, the lens is designed to focus onto the pupil light from distant objects — and the lens for the subject's non-dominant eye is provided with an optical power designed to focus onto the pupil light from objects that are between near and distant objects. For example, the non-dominant eye may be fitted with a lens designed to provide a distance power between 50% and 80% of the interval between near and distance — that is, this line may be designed to focus onto the pupil light from objects that are a distance from the subject between 50% and 80% of the distance from near objects to distant objects. Preferably, the optical power of this lens is biased toward distance — that is, the lens is biased to focus on objects that are near the far end of the 50% to 80% range. In this way, the non-dominant eye is fit with a lens having an optical power less than what would be expected for distance vision, but still greater than what is necessary to focus on objects that are further away than 50% of the range between near and distance near and distant objects. With a full monovision methodology, the lens for the dominant eye would be provided with 100% of the optical power of the lens pair, while the lens for the non-dominant eye would have 0% of that optical power.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A multifocal ophthalmic lens, said lens comprising a body including a central region and at least first and second concentric annular regions, the first annular region extending around the central region, and the second annular region extending around the first annular region, and wherein:

the central region has an optical surface area and a first optical power;

the first annular region includes a plurality of concentric, annular first sub-regions, the first sub-regions being radially positioned in series and including a radially innermost first sub-region and at least one additional first sub-region;

the radially innermost first sub-region has a second optical power, said second optical power differs from said first optical power, said first sub-region has an optical surface area about equal to or larger than the optical surface area of the central region;

the sum of the optical surface areas of the central region and the first annular region that have the first optical power is proportional to the sum of the optical surface areas of the first annular region that have the second optical power to provide a lens which varies the optical power of the lens as a function of pupil diameter and luminance levels; and the remaining optical surface area of the lens having an optical power that when combined with the optical power of the central region and the first annular region, provides said lens with a dominant first optical power at high and low levels of luminance, and an approximately equal distribution between the first and the second optical powers at mid levels of luminance.

2. A lens according to claim 1, wherein:

said first subregions include said radially innermost first subregion and a plurality of additional first subregions; and the additional first subregions alternately have the first and second optical powers.

3. A lens according to claim 2, wherein said first optical power is a distance optical power, and said second optical power is a near optical power.

4. A lens according to claim 1, wherein about 60% or more of the optical surface area of the lens has the first optical power.

5. A lens according to claim 4, wherein:

about 70% of the optical surface area of the lens has the first optical power; and about 30% of the optical surface area of the lens has the second optical power.

6. A multifocal ophthalmic lens for the treatment of presbyopia containing both a near optical power and a distance optical power, said lens containing an optical surface with a central region having said distance optical power, a first annular region exterior to said central region and containing an about equal or more near optical power area than the total distant optical power area in the central and first annular regions combined, said optical area of the central region and the optical area of the annular region arranged to vary the optical power in response to pupil diameter and luminance and a second annular region exterior said first annular region and containing sufficient distance optical power area such that the total distance optical power area in the central, first annular and second annular regions combined is greater than the total near optical power area in the central, first annular and second annular regions combined, said lens providing a dominant distance optical power correction at high and low levels of luminance, and an approximately equal distribution between near and distance optical power correction at mid levels of luminance.

7. The lens of claim 6, wherein the lens comprises annular regions of a concentric construction.

8. The lens of claim 6, wherein at least one of said annular regions comprises more than one annular sub-regions having more than one optical power.

9. A multifocal contact lens for use in the treatment of presbyopia, said lens comprising a body including a central region and at least first and second concentric annular regions, the first annular region extending around the central region, and the second annular region extending around the first annular region, and wherein:

the central region has an optical surface area and a first optical power;

the first annular region includes a plurality of concentric, annular first sub-regions, the first sub-regions being radially positioned in series and including a radially innermost first sub-region and at least one additional first sub-region;

the sum of the optical surface areas of the central region and the first annular region that have the first optical power being proportional to the sum of the optical surface areas of the first annular region that have a second optical power, said second optical power differs from said first optical power, to provide a lens which varies the optical power of the lens as a function of the wearer's pupil diameter in response to variations in luminance levels encountered by the wearer; and the remaining optical surface area of the lens having an optical power that provides said wearer with a contact lens which varies the combined optical power of the central region, first annular region and the second annular region as a function of luminance, with a dominant first optical power at pupil diameters of less than 25% of maximum pupil diameter and greater than 75% of maximum pupil diameter, and an approximately equal distribution between the first and the second optical powers at pupil diameters greater than 40% and less than 60% of maximum pupil diameter.

10. The multifocal contact lens of claim 9, wherein said radially innermost first sub-region has a second optical power, and has an optical surface area about equal to or larger than the optical surface area of the central region.

11. The multifocal contact lens of claim 10, wherein said radially innermost first sub-region has a second optical power, and has an optical surface area about equal to the optical surface area of the central region.

12. The multifocal contact lens as claimed in claim 9 wherein said lens provides a 100% distance optical correction at high levels of luminance wherein the pupil diameter is no greater than 25% of maximum pupil diameter.

13. The multifocal contact lens as claimed in claim 9 wherein said lens provides greater than 70% distance optical correction at low levels of luminance wherein the pupil diameter is at maximum pupil diameter.

14. The multifocal contact lens as claimed in claim 9 wherein said central region includes a central 3 mm diameter circular portion.

15. The multifocal contact lens as claimed in claim 9 wherein said first annular region includes an annular portion of the lens from 3 mm to 5.5 mm of the lens central diameter.

16. The multifocal contact lens as claimed in claim 9 wherein said first annular region includes a plurality of alternating annular zones of distance and near add optical corrections.

17. The multifocal contact lens as claimed in claim 9 wherein said first and second optical powers are formed in the back surface of the lens.

18. The multifocal contact lens as claimed in claim 9, wherein the sum of the optical surface areas for the lens incorporates the optical ratios:

| Pupil Size (as a % of maximum size) | Percentage of the effective corrective area of the lens that is distance corrective power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 70.6 | 29.4 |
| 37.5 | 49.0 | 51.0 |
| 43.8 | 49.8 | 50.2 |
| 50.0 | 49.4 | 50.6 |
| 56.3 | 49.9 | 50.1 |
| 62.5 | 49.6 | 50.4 |
| 68.8 | 48.2 | 51.8 |
| 75.0 | 56.4 | 43.6 |
| 81.3 | 62.9 | 51.8 |
| 87.5 | 68.0 | 37.0 |
| 93.8 | 72.1 | 27.9 |
| 100 | 75.5 | 24.5 |

19. The multifocal contact lens as claimed in claim 9, wherein the sum of the optical surface areas for the lens incorporates the optical ratios:

| Pupil Size (as a % of maximum size) | Percentage of the effective corrective area of the lens that is distance correction power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 64.0 | 36.0 |
| 37.5 | 44.4 | 55.6 |
| 43.8 | 43.8 | 56.2 |
| 50.0 | 56.9 | 43.1 |
| 56.3 | 55.2 | 44.8 |
| 62.5 | 44.7 | 55.3 |
| 68.8 | 47.5 | 52.5 |
| 75.0 | 55.9 | 44.1 |
| 81.3 | 62.4 | 37.6 |
| 87.5 | 67.6 | 32.4 |
| 93.8 | 71.8 | 28.2 |
| 100 | 75.2 | 24.8 |

20. A multifocal ophthalmic lens as claimed in claim 9 wherein the sum of the optical surface areas for the lens incorporates the optical ratios:

| Pupil Size (as a % of maximum size) | Percentage of the effective corrective area of the lens that is distance corrective power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 70.6 | 29.4 |
| 37.5 | 49.0 | 51.0 |
| 43.8 | 49.8 | 50.2 |
| 50.0 | 49.4 | 50.6 |
| 56.3 | 49.9 | 50.1 |
| 62.5 | 49.6 | 50.4 |
| 68.8 | 48.2 | 51.8 |
| 75.0 | 56.4 | 43.6 |
| 81.3 | 62.9 | 51.8 |
| 87.5 | 68.0 | 37.0 |
| 93.8 | 72.1 | 27.9 |
| 100 | 75.5 | 24.5 |

21. A multifocal ophthalmic lens as claimed in claim 9 wherein the sum of the optical surface areas for the lens incorporates the optical ratios:

| Pupil Size (as a % of maximum size) | Percentage of the effective corrective area of the lens that is distance correction power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 64.0 | 36.0 |
| 37.5 | 44.4 | 55.6 |
| 43.8 | 43.8 | 56.2 |
| 50.0 | 56.9 | 43.1 |
| 56.3 | 55.2 | 44.8 |
| 62.5 | 44.7 | 55.3 |
| 68.8 | 47.5 | 52.5 |
| 75.0 | 55.9 | 44.1 |
| 81.3 | 62.4 | 37.6 |
| 87.5 | 67.6 | 32.4 |
| 93.8 | 71.8 | 28.2 |
| 100 | 75.2 | 24.8 |

22. A multifocal ophthalmic lens as claimed in claim 9 wherein the sum of the optical surface areas for the lens incorporates the optical ratios:

| Pupil Size (as a % of maximum size) | Percentage of the effective corrective area of the lens that is distance correction power | Percentage of the effective corrective area of the lens that is near corrective power |
| --- | --- | --- |
| 0.00 | 0 | 0 |
| 6.3 | 100 | 0 |
| 12.5 | 100 | 0 |
| 18.8 | 100 | 0 |
| 25.0 | 100 | 0 |
| 31.3 | 64.0 | 36.0 |
| 37.5 | 44.4 | 55.6 |
| 43.8 | 43.8 | 56.2 |
| 50.0 | 56.9 | 43.1 |
| 56.3 | 63.8 | 36.2 |
| 62.5 | 51.7 | 48.3 |
| 68.8 | 51.6 | 48.4 |

-continued

| Pupil Size (as a % of maximum size) | Percentage of the effective corrective area of the lens that is distance correction power | Percentage of the effective corrective area of the lens that is near corrective power |
| --- | --- | --- |
| 75.0 | 59.3 | 40.7 |
| 81.3 | 65.3 | 34.7 |
| 87.5 | 70.1 | 29.9 |
| 93.8 | 74.0 | 26.0 |
| 100 | 77.1 | 22.9 |

23. The multifocal ophthalmic lens as claimed in claim 1, wherein said optical surface area of said lens provides approximately equal areas of distance optical power and near optical power when the pupil of the wearer of said lens is approximately 40% dilated.

24. The multifocal ophthalmic lens as claimed in claim 1, wherein said optical surface area of said lens provides approximately 80% distance optical power and 20% near optical power.

* * * * *